Jan. 21, 1936. R. M. GILSON 2,028,541
APPARATUS FOR AUTOMATIC REGULATION OF RECTIFIERS
Filed Dec. 30, 1933
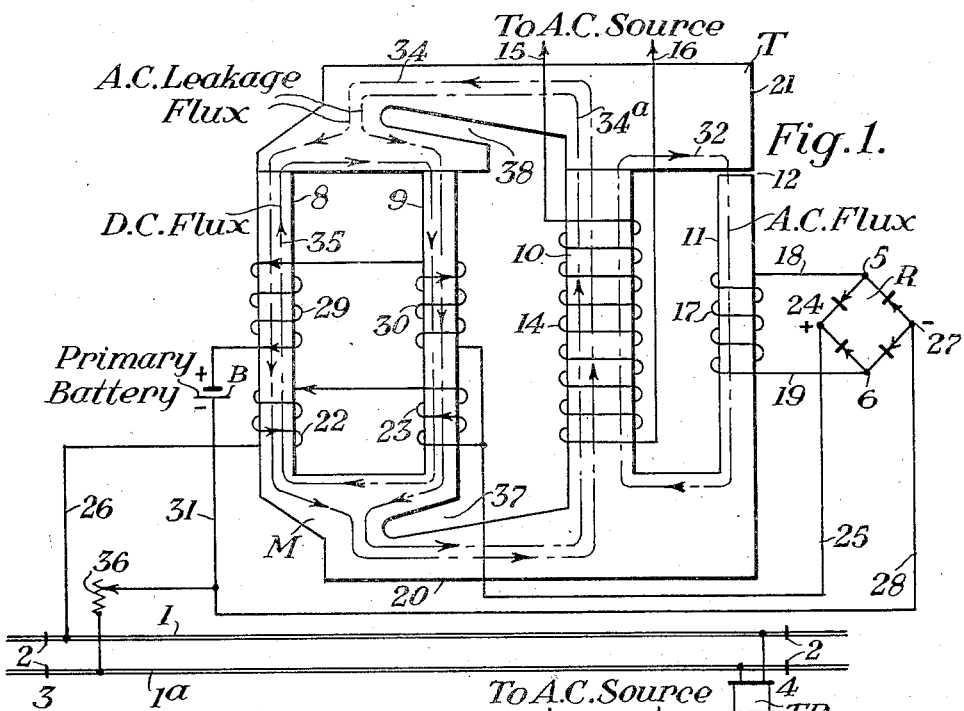
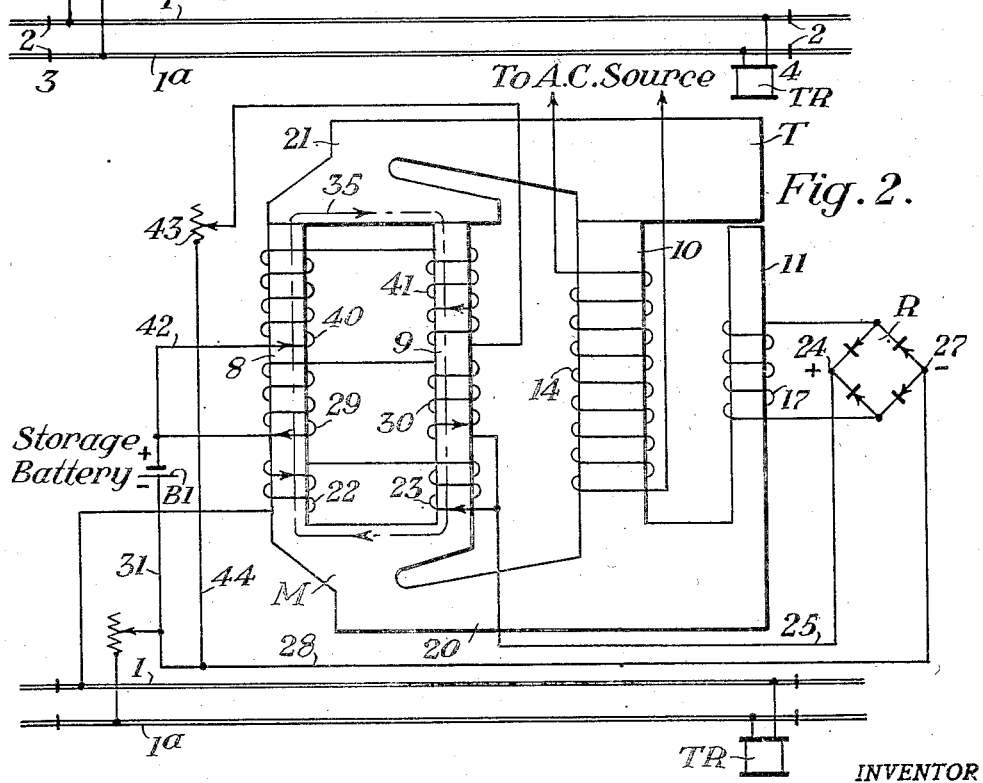
INVENTOR
Robert M. Gilson
BY
HIS ATTORNEY Patented Jan. 21, 1936

2,028,541

UNITED STATES PATENT OFFICE 2,028,541

APPARATUS FOR AUTOMATIC REGULATION OF RECTIFIERS

Robert M. Gilson, Pittsburgh, Pa., assignor to The Union Switch & Signal Company, Swissvale, Pa., a corporation of Pennsylvania Application December 30, 1933, Serial No. 704,647

11 Claims. (Cl. 175—363)

My invention relates to electrical regulating apparatus for rectifiers, and particularly to apparatus for automatically regulating the output of a rectifier during variations in the voltage of the source supplying current to the rectifier and also during variations in the demand of the load on the rectifier.

A feature of my invention is the provision of novel and improved apparatus for automatically regulating the output of a rectifier by controlling the reluctance of the rectifier transformer. A further feature of my invention is the provision of novel and improved apparatus for automatically regulating the voltage applied to a rectifier in proportion to the discharge of a battery provided as an auxiliary source of direct current energy for the load circuit, and which battery is continuously connected with the circuit. With such control of the applied voltage to the rectifier it is not necessary for the auxiliary battery to normally supply the load circuit with more than a relatively small percent of the load current, the remaining portion of the load current being supplied directly from the rectifier. The auxiliary battery is available, however, in case of a complete loss of power to the rectifier, as a supply for the entire load. A still further feature of my invention is the provision of improved means for regulating a rectifier so that a storage battery provided as an auxiliary source of energy is normally trickle charged. Other features and advantages of my invention will appear as the description progresses.

Apparatus embodying my invention includes a rectifier transformer in which the flux common to and threading both the primary and secondary windings is controlled by varying the reluctance of a leakage magnetic circuit in shunt with the main magnetic circuit of the transformer.

I will describe two forms of apparatus embodying my invention, and will then point out the novel features thereof in claims.

In the accompanying drawing, Fig. 1 is a view partly diagrammatic and partly in elevation, showing one form of regulating apparatus embodying my invention and wherewith a source of direct current requiring no charging current, such for example as a primary battery, is provided as an auxiliary source of energy for the load circuit. Fig. 2 is a view of regulating apparatus similar to Fig. 1, except that a storage battery is provided as an auxiliary source of energy, which battery is normally trickle charged.

Similar reference characters refer to similar parts in each of the views.

Referring to Fig. 1, the load, in the form here shown, is a railway signaling track circuit. Reference characters 1 and 1ª designate the traffic rails of a railway track, which rails are divided by insulated rail joints 2 to form a track section 3—4. Connected across the traffic rails of this section is a direct current track relay TR. For energizing the track relay TR direct current is supplied across the rails at the opposite end of the section from a source of periodic current through a full-wave rectifier, or from a primary battery, or from both, as will shortly appear. As is well-known, the effective resistance of a railway track circuit will vary due to variations in the resistance of the track ballast in response to changes in weather conditions, as well as due to the presence and absence of trains. That is to say, the track circuit for the section 3—4 constitutes a load circuit having relatively wide variations in resistance.

The reference character T designates a rectifier transformer of the reactive type through the medium of which periodic current from any convenient source, such as an alternating current generator not shown, is applied to the input terminals of a full-wave rectifier R for supplying direct current to the track circuit. The rectifier R may be of any desired type and preferably is of the well-known copper oxide type. The transformer T may take different forms and in the form here shown comprises a magnetizable core structure M with four parallel legs 8, 9, 10 and 11, which legs are connected together at one end by an end core member 20. The opposite ends of the legs 8, 9, 10 and 11 are adapted to fit a magnetizable bridging member 21 to form closed magnetic circuits as will appear later in the description. Air gaps such as the air gap 12 between leg 11 and the bridging member 21 may be provided should it seem desirable. The intermediate leg 10 carries a primary winding 14 which is supplied with current from the alternating current source over the wires 15 and 16. A secondary winding 17 is mounted on the outside leg 11 and is connected by wires 18 and 19 with the input terminals 5 and 6 of the full-wave rectifier R. It is clear that alternating flux due to the alternating current supplied to the primary winding 14 will flow in the magnetic circuit including the legs 10 and 11, end core member 20 and bridging member 21, and this flux which is indicated by the line 32, threading the secondary winding 17 will induce therein an electromotive force which is applied to the input terminals of the rectifier R. The value of the electromotive force induced in the winding 17 will be determined in accordance with the ratio between the number of turns of the two windings 14 and 17. Although the primary winding 14, or the secondary winding 17, or both, may be provided with taps in the customary manner for transformers to vary the voltage ratio, when a connection is once made, the relationship between the primary winding 14 and the secondary winding 17 becomes fixed and hence, variations in voltage in the alternating current source will ordinarily cause corresponding variations of the voltage induced in the secondary winding 17, and in turn, variations of the voltage applied to the input of the rectifier R.

For the purpose of automatically regulating the voltage applied to the rectifier R during variations of the voltage of the alternating current source, the flux linking the secondary winding 17 is varied by varying the reluctance of the core structure M of the transformer. That is to say, the portion of the flux from the primary winding 14 which links the secondary winding 17 is varied by varying the reluctance of the core structure M. The two remaining legs 8 and 9 of the core M together with the end member 20 and the bridging member 21, provide a magnetic circuit in shunt with the main magnetic circuit including the legs 10 and 11, in which shunt circuit a portion of the flux from the primary winding 14 flows. This shunt magnetic circuit is made up of two parallel branches, one including the leg 8 and the other including the leg 9 as will be understood by an inspection of Fig. 1. The end core member 20 is provided with a slot 37 and the bridging member 21 is provided with a similar slot 38, the arrangement being such that the path through the branch of the magnetic shunt circuit including the intermediate leg 9 is substantially equal in length to the path of the branch including the outer leg 8. It follows that the two branches of the magnetic shunt offer substantially equal reluctance to the leakage flux, the leakage flux threading these two branches being indicated by the lines 34 and 34ª.

For the purpose of varying the reluctance of this shunt magnetic circuit, the flux density of the legs 8 and 9 is governed by regulating windings mounted thereon and through which direct current is caused to flow in accordance with variations in the operating conditions. A first regulating winding, which is in two portions or coils 22 and 23, is mounted on the legs 8 and 9, the coils 22 and 23 being carried by the legs 8 and 9, respectively. The two coils 22 and 23 are preferably of equal number of turns and are connected in such a manner that the magnetic fluxes created thereby are additive and flow in the closed magnetic circuit indicated by the line 35. It is to be noted that the alternating flux threading the two coils 22 and 23 induces equal and opposite alternating voltages. Conversely, no magnetizing action is produced in the legs 10 and 11 due to the direct current flowing in the coils 22 and 23. One terminal of the winding 22—23 is connected with the positive output terminal 24 of the rectifier R over a wire 25 and the opposite terminal of the winding 22—23 is connected with the rail 1 over a wire 26. The opposite or negative terminal 27 of the rectifier R is connected with the other rail 1ª of the track circuit over a wire 28 and a current limiting resistor 36. It is clear that the regulating winding 22—23 is interposed in the connection of the track circuit with the output terminals of the rectifier R, and hence the current supplied from the rectifier R to the track circuit flows through the regulating winding 22—23. The terminal 24 being the positive terminal of the rectifier, this direct current will flow over wire 25, through winding 22—23 in the direction indicated by the arrows placed on coils 22 and 23, wire 26, rail 1, track relay TR, rail 1ª, resistor 36 and wire 28 to the negative terminal 27 of the rectifier R. Consequently, relay TR will be energized, and a given flux density will be established for the legs 8 and 9 of the transformer T.

A second regulating winding which is in two portions or coils 29 and 30 is also mounted on the legs 8 and 9, the coils 29 and 30 being carried by the legs 8 and 9, respectively. The two coils 29 and 30 are preferably of an equal number of turns and are connected in such a manner that fluxes created thereby are additive and flow in the closed magnetic circuit indicated by the line 35. This second regulating winding 29—30 is further so mounted on the legs 8 and 9 that when a direct current flowing therein has the direction indicated by the arrows placed on the coils 29 and 30, the flux created by this current opposes the flux created by the load current flowing in the first regulating winding 22—23. It will be noted that the alternating current flux linking the two coils 29 and 30 induces equal and opposite alternating voltages therein, and also that no magnetizing action is produced in the legs 10 and 11 by the flux from the winding 29—30. One terminal of the winding 29—30 is connected with the wire 25 leading from the positive terminal 24 of the rectifier R, and the other terminal is connected with the positive terminal of a primary battery B, the negative terminal of which is connected by a wire 31 with the wire 28 leading from the rail 1ª to the negative terminal 27 of the rectifier R. It is clear that the second regulating winding 29—30 is serially connected with the primary battery B and that these two are connected across the output terminals of the rectifier R in parallel with the track circuit, the polarity of the battery B opposing the polarity of the rectifier R as indicated by the plus and minus signs.

In normal operation, the alternating current supplied to the primary winding 14 creates a flux, part of which flows in the main magnetic circuit as indicated by the line 32 and the remaining portion of which flows in the shunt magnetic circuit as indicated by the two lines 34 and 34ª, the relative values of the fluxes in the two circuits being inversely proportional to the reluctance of the respective circuits. At some instant the direction of this alternating current flux will be that indicated by the arrows placed on the lines 32, 34 and 34ª.

The flux linking the secondary winding 17 will induce an electromotive force therein which is applied to the input terminals of the rectifier R causing thereby a direct current to flow in the load circuit previously traced which includes the regulating winding 22—23 and the track circuit. The direct current flux created by the load current flowing in the winding 22—23 saturates the legs 8 and 9 to a given degree and establishes a given reluctance for the magnetic shunt which reluctance determines what portion of the flux from the primary winding 14 will flow in the shunt magnetic circuit. The parts are so proportioned and adjusted that the direct voltage applied across the traffic rails 1 and 1a at the left-hand end of the track circuit is that required to give satisfactory and reliable operation of the track relay TR. The parts are further so adjusted that normally no current flows into or out of the primary battery B, the polarity of the battery being opposite and the voltage substantially equal to that across the output terminals of the rectifier R. Consequently, under normal operating conditions of the track circuit and of the alternating cururent source, the desired direct current voltage is steadily applied across the feed end of the track circuit and the auxiliary battery B is required to supply little if any current to the track circuit, substantially all of the load current being furnished through the rectifier R.

In case the voltage of the alternating current source rises above its normal value, the induced voltage of the secondary winding 17 will rise and in turn the direct current voltage across the terminals of the rectifiers R will tend to rise correspondingly. Current will now tend to flow into the battery B through the winding 29—30, the circuit extending from the positive terminal 24 of rectifier R over wire 25, winding 29—30, battery B in opposition to its voltage, and wires 31 and 28 to the negative terminal 27 of the rectifier R. As previously pointed out, the winding 29—30 is so mounted on the cores 8 and 9 that the flux created by current flowing in the direction toward the battery B tends to neutralize the flux created by the load current flowing in the winding 22—23. The resultant decrease in the flux density in the legs 8 and 9 reduces the reluctance of the magnetic shunt and increases the alternating current flux leakage. That is, the portion of the flux from the primary winding 14 which threads the shunt circuit is increased and the portion which links the secondary winding 17 is decreased. As a result of this decrease in the flux which links the secondary winding 17, the electromotive force induced therein is decreased, decreasing in turn the direct current voltage of the rectifier R which tends to hold the current delivered to the load circuit at the normal value.

On the other hand, if the voltage of the alternating current source drops below its normal value, the direct current voltage across the terminals of the rectifier R will drop and current will flow from the primary battery B into the track circuit, the circuit extending from the positive terminal of the battery B through winding 29—30, winding 22—23, wire 26, rail 1, track relay TR, rail 1a, resistor 36, and wire 31 to the negative terminal of the battery B. The direction of the current flowing in the winding 29—30 will now be opposite to that indicated by the arrows and hence the flux created thereby will add its effect to that created by the load current flowing in the winding 22—23 and the flux density in the legs 8 and 9 will be increased with the result that the reluctance of the magnetic shunt is increased. This increase in the reluctance of the magnetic shunt decreases the leakage flux and consequently the portion of the flux from the primary winding 14 which links the secondary winding 17 is increased, increasing in turn the voltage applied to the rectifier R thus tending to increase the current which the rectifier delivers to the load to the normal value and to reduce the discharge from the primary battery B.

In the event the resistance of the track circuit decreases, causing the load on the rectifier R to increase, the voltage across the output of the rectifier will drop, and due to the higher voltage of the battery B, current will flow from the battery B through the winding 29—30 to the track circuit. The flux from the winding 29—30 assists the flux from the winding 22—23 and the reluctance of the magnetic shunt is increased, decreasing the alternating current leakage flux. As a result, the portion of the flux from the primary winding 14 which links the secondary winding 17 will be increased, thus tending to supply the entire load through the rectifier R and to decrease the discharge from the battery B.

In the event that the ballast of the track section 3—4 is dry or frozen and the resistance of the track circuit is increased so that the load becomes less, the voltage output of the rectifier R will tend to be increased and current will flow into the battery B. Under this condition the flux from the winding 29—30 tends to neutralize the flux from the winding 22—23 and the reluctance of the magnetic shunt is decreased with the result that the portion of the flux from the primary winding 14 which links the secondary winding 17 is decreased. This decrease in the flux threading the secondary winding 17 causes a corresponding decrease in the voltage applied to the rectifier, thus tending to reduce the output of the rectifier. It is clear, therefore, that the output of the rectifier is automatically regulated and maintained substantially constant regardless of variations in the current drawn by the load and regardless of variations in the voltage of the alternating current supply. It is not necessary, therefore, for the auxiliary source of direct current energy to supply more than a very small percent of the load current under ordinary operating variations. In the case of an abnormal variation or in the case of a complete failure of the alternating current source, the auxiliary battery B will at once supply the necessary current to the track circuit and uninterrupted operation thereof will be maintained.

Referring now to Fig. 2, the apparatus is the same as Fig. 1 except that the primary battery B is replaced by a storage battery B1 and an additional regulating winding 40—41 is mounted on the legs 8 and 9 of the transformer T, the coils 40 and 41 comprising this additional regulating winding being carried on the legs 8 and 9, respectively. The coils 40 and 41 are preferably of an equal number of turns and are wound in such a manner that fluxes created thereby are additive, and flow in the closed magnetic circuit indicated by the line 35. The winding 40—41 is preferably of a greater number of turns than winding 29—30 and is so mounted on the legs 8 and 9 that the flux resulting from the current flowing therein in the direction indicated by the arrows which are placed on the coils 40 and 41 tends to neutralize the flux created by winding 29—30 when the current flowing therethrough flows in the direction indicated by the arrows which are placed on the coils 29 and 30. One terminal of the winding 40—41 is connected with the positive terminal of the storage battery B over a wire 42 and the opposite terminal is connected through a resistor 43 and a wire 44 with the wire 28 leading from the rail 1a to the negative terminal 27 of the rectifier R. That is to say, the winding 40—41 is connected across the storage battery B1. In order that the storage battery B1 may be charged, the parts are so proportioned that the normal direct current voltage across the rectifier R is slightly in excess of the voltage of the battery B1 and hence a charging current will flow from the positive terminal 24 of rectifier R over wire 25, winding 29—30 in the direction indicated by the arrows, battery B1 in opposition to its voltage and wires 31 and 28 back to the negative terminal 27 of the rectifier R. Under these conditions, current will also flow from the positive terminal 24 of the rectifier over the same circuit just traced up to the positive terminal of the battery B1 and thence over wire 42, winding 40—41, resistor 43 and wires 44 and 28 back to the negative terminal 27 of the rectifier. While the current flowing in the winding 40—41 will be small in comparison with the current flowing in the winding 29—30, the windings 40—41 and 29—30 are so designed with respect to their number of turns that the flux created by the winding 40—41 will substantially neutralize the flux created by the winding 29—30. That is, the normal charging current for the battery B1 produces no magnetizing action in the legs 8 and 9. It follows that the flux density in the legs 8 and 9 is normally determined by the load current flowing in the winding 22—23 the same as in Fig. 1. An increase in the voltage of the alternating current supply will cause the output voltage of the rectifier R to increase and the current forced through the winding 29—30 into the storage battery B1 will be increased. The flow of current in the winding 40—41 will remain substantially constant inasmuch as the voltage drop across the battery B1 increases but little notwithstanding the increase in the charging current. Consequently, this increase in the charging current in the winding 29—30 creates a flux which opposes that created by the winding 22—23 and the reluctance of the magnetic shunt is reduced, tending to decrease the portion of the flux from the primary winding 14 which threads the secondary winding 17, with the result that the output of the rectifier is reduced toward its normal value. A drop in the voltage of the alternating current source will be reflected in a corresponding drop at the output of the rectifier R and the storage battery B1 will now supply current to the load circuit. This discharge current flowing in the winding 29—30 creates a flux that assists the flux created by the winding 22—23 and the reluctance of the magnetic shunt is increased, tending to increase the portion of the flux from the primary winding 14 which threads the secondary winding 17. The electromotive force induced in the secondary winding 17 will now be increased, tending to restore the output of the rectifier R to its normal value. Fluctuations of the track circuit resistance will be reflected in an increase in the charging current for the storage battery B1 when the resistance of the track circuit is increased and in a discharge from the storage battery B1 when the resistance of the track circuit is decreased. It is clear that such variations in the track circuit resistance will be effective to automatically regulate the output of the rectifier R the same as described for the apparatus of Fig. 1. It will not be necessary for the storage battery B1 to supply more than a very small percent of the load current under all ordinary variations of the alternating current voltage and of the load circuit resistance, but this battery will be available to supply current for operating the track circuit in the case of a failure of the alternating current source.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. The combination with a variable load, a storage battery, a rectifier and a source of periodic current; of a transformer comprising a primary winding, a secondary winding, three separate regulating windings and a core of magnetizable material providing a magnetic circuit carrying said primary and secondary windings and a stationary magnetic shunt carrying all three of said regulating windings; means for connecting the primary winding with the source of periodic current, means for connecting the secondary winding with the input terminals of the rectifier, a load circuit for serially connecting a first of said regulating windings and the load with the output of the rectifier to establish a given flux density in the magnetic shunt, another circuit for connecting the storage battery with the output of the rectifier to normally charge said battery and including a second of said regulating windings, and means for connecting the third of said regulating windings across the storage battery and arranged that the flux created therewith substantially neutralizes the normal flux of the second of said regulating windings whereby said first and second of the regulating windings are effective to jointly vary the reluctance of the magnetic shunt in inverse proportion to variations of the output voltage of the rectifier and in inverse proportion to variations of the load resistance.

2. In combination, a magnetizable core with four parallel legs, a primary winding supplied with periodic current and mounted on one of said legs, a secondary winding mounted on a second leg of said core and supplying current to the input of a rectifier, a regulating winding having two equal portions mounted on the third and fourth legs of said core respectively and arranged that fluxes created therewith are additive, a load receiving current from the rectifier, a battery, and means for serially connecting said battery and said regulating winding with the rectifier in parallel with the load to vary the reluctance of said third and fourth legs and arranged that the polarity of the battery opposes the polarity of the rectifier whereby the flux from the primary winding which links the secondary winding is governed in accordance as to whether current is fed to the battery or the battery feeds current to the load.

3. In combination, a magnetizable core with four parallel legs, a primary winding supplied with periodic current and mounted on one of said legs, a secondary winding mounted on a second leg of said core and supplying current to the input terminals of a rectifier, a first regulating winding having two equal portions mounted on the third and fourth legs of said core respectively and arranged that fluxes created therewith are additive, a second regulating winding having two equal portions mounted on the third and fourth legs of said core respectively and arranged that fluxes created therewith are additive, a load, means for serially connecting said load and the first regulating winding across the output terminals of the rectifier, a battery, and means for serially connecting said battery and the second regulating winding across the output terminals of the rectifier whereby the fraction of the flux from said primary winding which links the secondary winding is varied in inverse proportion to the load resistance and in inverse proportion to the voltage of the periodic current and according to whether current is fed to the battery or the battery feeds current to the load.

4. In combination, a magnetizable core with four parallel legs, a primary winding supplied with periodic current and mounted on one of said legs, a secondary winding mounted on a second one of said legs and supplying current to the input terminals of a rectifier, a load circuit connected with the output side of said rectifier, a first and a second regulating winding each with portions mounted on each of the two remaining legs of said core and which are arranged that the fluxes created by the two portions of the winding are additive, a storage battery, a circuit for serially connecting the storage battery and the first regulating winding with the rectifier in parallel with said load circuit and arranged that said storage battery is normally charged from said rectifier at a predetermined rate, and means for connecting the second regulating winding across the storage battery and arranged that the flux created therewith approximately neutralizes the flux created by the normal charging current in said first regulating winding whereby the reluctance of said two remaining legs is changed to vary the fraction of the flux from the primary winding which links the secondary winding in inverse proportion to the load circuit resistance and in inverse proportion to the voltage of the periodic current.

5. In combination, a magnetizable core with four parallel legs, a primary winding supplied with periodic current and mounted on one of said legs, a secondary winding mounted on a second one of said legs and supplying current to the input terminals of a rectifier; a first, a second and a third regulating winding each with portions mounted on each of the two remaining legs of said core and which are arranged that the fluxes created by the two portions of the winding are additive, a load circuit connected with the output side of said rectifier and including the first of said regulating windings, a storage battery, a circuit for serially connecting the storage battery and the second regulating winding with the rectifier and arranged that the storage battery is normally charged at a predetermined rate, and means for connecting the third regulating winding across the storage battery and arranged that the flux created therewith approximately neutralizes the flux created by the normal charging current in said second regulating winding whereby the reluctance of said two remaining legs is changed to vary the fraction of the flux from the primary winding which links the secondary winding in inverse proportion to the load circuit resistance and in inverse proportion to the voltage of the periodic current.

6. In combination; a magnetizable core with a first, a second, a third and a fourth leg connected together at one end by an end core member; a magnetizable bridging member adapted to fit the opposite ends of said legs, said bridging and end core members shaped in such a manner that the magnetic circuit including said third and second legs and the magnetic circuit including said third and first legs are of substantially equal lengths, a primary winding supplied with periodic current and mounted on said third leg, a secondary winding mounted on said fourth leg and supplying current to the input terminals of a rectifier, a first regulating winding have two equal portions mounted on said first and second legs respectively and arranged that fluxes created therewith are additive, a second regulating winding having two equal portions mounted on said first and second legs respectively and arranged that fluxes created therewith are additive, a load, a battery, means for serially connecting the load and the first regulating winding with the rectifier, and means for serially connecting the battery and the second regulating winding with the rectifier in parallel with the load and said first winding, whereby the induction due to the flux from the primary winding which links the two portions of each of the two regulating windings is balanced out and the fraction of the flux from the primary winding which links the secondary winding is varied in inverse proportion to the load resistance and in inverse proportion to the voltage of the periodic current.

7. The combination with a variable load, a storage battery, a rectifier and a source of periodic current; of a transformer comprising a primary winding, a secondary winding, three regulating windings and a core of magnetizable material providing a magnetic circuit carrying said primary and secondary windings and a magnetic shunt carrying all three of said regulating windings; means for connecting the primary winding with the source of periodic current, means for connecting the secondary winding with the input terminals of the rectifier, a load circuit for serially connecting the first of said regulating windings and the load with the output of the rectifier to establish a given flux density in the magnetic shunt, another circuit for connecting the storage battery with the output of the rectifier to normally charge said battery and including a second of said regulating windings, a resistor, means including said resistor for connecting the third of said regulating windings across the storage battery and arranged in such manner that the flux created therewith substantially neutralizes the normal flux of the second of said regulating windings whereby said first and second regulating windings are effective to jointly vary the reluctance of the magnetic shunt in inverse proportion to variations of the output voltage of the rectifier and in inverse proportion to variations of the load resistance.

8. In combination, a magnetizable core having four legs, a primary winding mounted on one of said legs and supplied with periodic current, a secondary winding mounted on a second one of said legs and supplying current to the input terminals of a rectifier; a first, a second and a third regulating winding each with portions mounted on each of the two remaining legs of said core and arranged in such manner that the fluxes created by the two portions of the winding are additive, a load circuit connected with the output terminals of said rectifier and including the first of said regulating windings, a storage battery, a circuit for serially connecting the storage battery and the second regulating winding with the rectifier and arranged in such manner that the storage battery is normally charged at a predetermined rate, means for connecting the third regulating winding across the storage battery and arranged in such manner that the flux created therewith approximately neutralizes the flux created by the normal charging current in said second regulating winding whereby the reluctance of said two remaining legs is changed to vary the fraction of the flux from the primary winding which links the secondary winding in inverse proportion to the load circuit resistance and in inverse proportion to the voltage of the periodic current, and means for varying the current flowing in said third regulating winding independently of the current flowing in said first and said second regulating windings.

9. In combination, a magnetizable core having a main magnetic circuit as well as a leakage magnetic circuit comprising two parallel paths, a primary and a secondary winding linking said main magnetic circuit; a first and a second regulating winding each having a portion linking each of said two parallel paths of the leakage magnetic circuit in such manner that the fluxes set up thereby are substantially equal and are additive in said two paths, means for supplying said primary winding with periodic current, a rectifier supplied with current from said secondary winding, a load receiving current from said rectifier, means for energizing said first regulating winding in accordance with the current received by said load, a battery, and means for normally charging said battery from said rectifier at a predetermined rate through said second regulating winding, the flux set up by said second winding being opposed to the flux set up by said first winding, whereby the reluctance of said main magnetic circuit is changed to vary the fraction of the flux from the primary winding which links the secondary winding in inverse proportion to the load circuit resistance and in inverse proportion to the voltage of the periodic current.

10. In combination, a magnetizable core having a main magnetic circuit as well as a leakage magnetic circuit comprising two parallel paths, a primary and a secondary winding linking said main magnetic circuit; a first, second and third regulating winding each having a portion linking each of said two parallel paths of the leakage magnetic circuit in such manner that the fluxes set up thereby are substantially equal and are additive in said two paths, means for supplying said primary winding with periodic current, a rectifier supplied with current from said secondary winding, a load receiving current from said rectifier, means for energizing said first regulating winding in accordance with the current received by said load, a battery, means for normally charging said battery from said rectifier at a predetermined rate through said second regulating winding, the flux set up by said second winding being opposed to the flux set up by said first winding, and means for connecting said third regulating winding across said battery in such direction that normally the flux set up by said third winding substantially neutralizes the flux set up by said second regulating winding, whereby the reluctance of said main magnetic circuit is changed to vary the fraction of the flux from the primary winding which links the secondary winding in inverse proportion to the load circuit resistance and in inverse proportion to the voltage of the periodic current.

11. In combination, a magnetizable core having a main magnetic circuit as well as a leakage magnetic circuit comprising two parallel paths, a primary and a secondary winding linking said main magnetic circuit, a first and a second regulating winding each having a portion linking each of said two parallel paths of the leakage magnetic circuit in such manner that the fluxes set up thereby are substantially equal and are additive in said two paths, means for supplying said primary winding with periodic current, a rectifier supplied with current from said secondary winding, a load receiving current from said rectifier, means for energizing said first regulating winding in accordance with the current received by said load, a battery, and a circuit for connecting said battery with said rectifier through said second regulating winding in such direction that the flux set up by the second winding due to current which tends to flow into said battery is opposed to the flux set up by said first winding, whereby the reluctance of said main magnetic circuit is changed to vary the fraction of the flux from the primary winding which links the secondary winding in inverse proportion to the load circuit resistance and in inverse proportion to the voltage of the periodic current.

ROBERT M. GILSON.